United States Patent
Oshilaja et al.

(10) Patent No.: US 7,517,422 B2
(45) Date of Patent: Apr. 14, 2009

(54) NON-VINYL FLOORING AND METHOD FOR MAKING SAME

(75) Inventors: Risi Oshilaja, Ewing, NJ (US); John Pearson, Hamilton Township, NJ (US); David Lan, Wilmington, DE (US)

(73) Assignee: Congoleum Corporation, Trenton, NJ (US)

( * ) Notice: Subject to any disclaimer, the term of this patent is extended or adjusted under 35 U.S.C. 154(b) by 0 days.

(21) Appl. No.: 11/706,171

(22) Filed: Feb. 13, 2007

(65) Prior Publication Data

US 2007/0138700 A1   Jun. 21, 2007

Related U.S. Application Data

(62) Division of application No. 10/653,006, filed on Aug. 28, 2003, now Pat. No. 7,175,904.

(51) Int. Cl.
  B29C 65/18 (2006.01)
  B32B 38/04 (2006.01)

(52) U.S. Cl. .................... 156/250; 156/308.2; 264/142; 264/152

(58) Field of Classification Search ............... 156/71, 156/250, 260, 308.2; 264/140–142, 148, 264/152
See application file for complete search history.

(56) References Cited

U.S. PATENT DOCUMENTS

| | | | |
|---|---|---|---|
| 4,083,821 A | 4/1978 | Harris | |
| 4,083,824 A * | 4/1978 | Harris | 524/425 |
| 4,191,798 A | 3/1980 | Schumacher et al. | |
| 4,447,479 A * | 5/1984 | Harrison et al. | 428/36.4 |
| 4,587,284 A * | 5/1986 | Luissi et al. | 524/17 |
| 5,276,082 A | 1/1994 | Forry et al. | |
| 5,298,558 A | 3/1994 | Sullivan et al. | |
| 5,342,889 A | 8/1994 | Sullivan et al. | |
| 5,387,635 A * | 2/1995 | Rowland et al. | 524/379 |
| 5,728,476 A | 3/1998 | Harwood et al. | |
| 5,958,563 A | 9/1999 | Harwood et al. | |

(Continued)

FOREIGN PATENT DOCUMENTS

EP   1 176 247 A1   7/2001

(Continued)

OTHER PUBLICATIONS

Nikhil V yas, "Polyolefin Elastomer Blends as an Alternative to Poly (vinyl chloride)", May 2002, pp. 1-131.

*Primary Examiner*—Philip C Tucker
*Assistant Examiner*—Sing P Chan
(74) *Attorney, Agent, or Firm*—Choate, Hall & Stewart LLP

(57) ABSTRACT

In one embodiment or the present invention, a non-vinyl flooring is described comprising a flooring substrate having a non-vinyl composition comprising a terpolymer comprising ethylene, methyl acrylate and acrylic acid and a copolymer comprising ethylene and methacrylic acid. In one embodiment of the present invention, the non-vinyl flooring comprises a resilient non-vinyl floor tile comprising a non-vinyl composition comprising a terpolymer and a copolymer. In another embodiment of the present invention, the non-vinyl flooring comprises a resilient non-vinyl sheet flooring comprising a non-vinyl composition comprising a terpolymer and a copolymer. Methods for making the non-vinyl tile and non-vinyl sheet flooring are described.

6 Claims, 2 Drawing Sheets

U.S. PATENT DOCUMENTS

| | | |
|---|---|---|
| 6,187,424 B1 | 2/2001 | Kjellqvist et al. |
| 6,214,924 B1 | 4/2001 | Bieser et al. |
| 6,217,982 B1 | 4/2001 | Dawson |
| 6,254,956 B1 | 7/2001 | Kjellqvist et al. |
| 6,300,398 B1 | 10/2001 | Jialanella et al. |
| 6,337,126 B1 | 1/2002 | Simpson et al. |

FOREIGN PATENT DOCUMENTS

| | | |
|---|---|---|
| WO | WO 95/08593 | 3/1995 |
| WO | WO 2003/100162 A3 | 4/2003 |

* cited by examiner

NON-VINYL FLOORING AND METHOD FOR MAKING SAME

CROSS-REFERENCE TO RELATED APPLICATION

This application is a divisional of U.S. patent application Ser. No. 10/653,006, now U.S. Pat. No. 7,175,904 filed Aug. 28, 2003. The foregoing application is incorporated by reference herein in its entirety.

BACKGROUND OF THE INVENTION

1. Field of the Invention

The invention relates generally to a non-vinyl flooring. More specifically, the invention is directed to a resilient non-vinyl floor tile and resilient non-vinyl sheet flooring and a method for making the same.

2. Description of Related Art

Resilient floor coverings are produced in the form of a continuous vinyl sheet or in the form of a tile, such as a vinyl composition tile. A resilient tile is typically a decorated monolayer structure or a composite, laminated structure that may include a base, a decorative layer disposed on top of the base, a protective film layer disposed on top of the decorative layer, a top coat disposed on top of the protective film layer, and a bottom coat disposed on the bottom side of the base. The base may be a mixture of limestone and a polymeric resin, typically a vinyl polymer, and may also include plasticizers, fillers, stabilizers, lubricants, tackifiers and pigments. For example, the base composition may include limestone, polyvinylchloride acetate resin, plasticizer and, optionally, pigments, where the organic materials function as a binder for the limestone. Alternatively, the base composition may include limestone, polyvinylchloride homopolymer, plasticizer and, optionally, pigments, where the organic materials also function as a binder for the limestone. Optionally, the tile may be mechanically embossed.

Sheet flooring typically comprises a bottom, thermally stable base or matte, such as a felt layer, coated with one or more layers of similarly formulated vinyl compounds, such as polyvinylchloride plastisols, with and without fillers. Typically an ink layer is disposed between the vinyl layers. The vinyl layers may optionally be chemically or mechanically embossed.

Both vinyl composition tiles and vinyl sheet flooring utilize vinyl polymer, which is inherently unstable and requires the use of extra stabilizing additives. It also has limited flexural and impact properties as the filler concentration is increased.

It would be desirable to avoid the use of vinyl polymer in the construction of a resilient floor tile or sheet flooring. In other words, it would be desirable to construct a non-vinyl floor tile or non-vinyl sheet flooring that has a composition that can be processed or made in a manner similar to that of a vinyl polymer tile or vinyl sheet flooring using standard equipment that has been used to process vinyl compositions. For example, it would be desirable to have a non-vinyl composition that is capable of being ground so that excess material, known as window frame, can be recycled. Further, it would be desirable to have a non-vinyl composition that is capable of being cut into separate tiles or an appropriate sized sheet flooring. Also, it would be desirable to have a non-vinyl composition that provides a non-vinyl floor tile or a non-vinyl sheet flooring with finished properties, such as flexibility and impact resistance, equal to or better than standard vinyl composition tiles or sheet flooring. Therefore, there is a need for resilient non-vinyl floor coverings.

SUMMARY OF THE INVENTION

In one embodiment or the present invention, a non-vinyl flooring is described comprising a flooring substrate having a non-vinyl composition comprising a terpolymer comprising ethylene, methyl acrylate and acrylic acid and a copolymer comprising ethylene and methacrylic acid.

In one embodiment of the present invention, the non-vinyl flooring comprises a resilient non-vinyl floor tile comprising a non-vinyl composition comprising a terpolymer and a copolymer. In another embodiment of the present invention, the non-vinyl flooring comprises a resilient non-vinyl sheet flooring comprising a non-vinyl composition comprising a terpolymer and a copolymer.

In one embodiment of the present invention, a method for making a non-vinyl tile is described comprising blending a terpolymer comprising ethylene, methyl acrylate and acrylic acid, a copolymer comprising ethylene and methacrylic acid, limestone and a tackifier to form a blended mixture; mixing the blended mixture, thereby forming a heated blended mixture; forming a first sheet from the heated blended mixture; separating the first sheet into a plurality of pieces; forming a second sheet from the plurality of pieces, wherein the second sheet has a predetermined thickness; reducing the predetermined thickness of the second sheet; forming a smooth surface on a top surface of the second sheet; and cutting the second sheet into a plurality of tiles.

In another embodiment of the present invention, a method for making a non-vinyl sheet flooring is described comprising blending a terpolymer comprising ethylene, methyl acrylate and acrylic acid, a copolymer comprising ethylene and methacrylic acid to form a blended mixture; applying the blended mixture to a backing substrate; consolidating the backing substrate and the blended mixture; and forming a sheet flooring having a predetermined thickness from the backing substrate and the blended mixture.

The various embodiments of the present invention provide a flooring material that is free of vinyl. Further, the present invention provides a non-vinyl composition that can be processed in a manner similar to a vinyl polymer tile or vinyl sheet flooring using standard equipment that has been used to process vinyl compositions.

Other features of the invention will appear from the following description in which the preferred embodiments are set forth in detail in conjunction with the accompanying drawings.

DETAILED DESCRIPTION OF THE PREFERRED EMBODIMENTS

Figure 1:
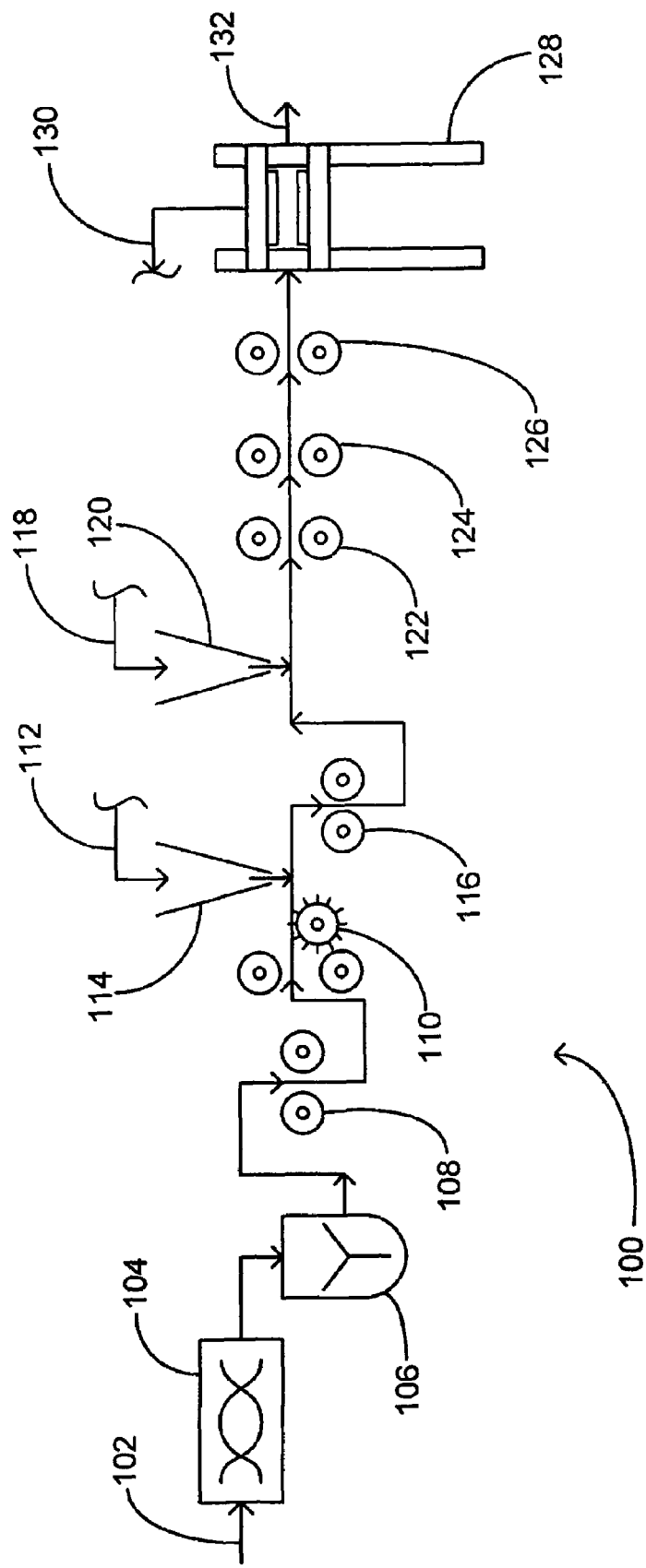
FIG. 1 is a process flow schematic of a process for making a resilient non-vinyl floor tile according to one embodiment of the present invention.

The resilient floor coverings of the present invention encompass any resilient floor covering or substrate comprising a non-vinyl composition or a composition free of vinyl polymer and includes, for example, resilient non-vinyl floor tiles and resilient non-vinyl sheet flooring. However, it should be appreciated that any floor covering may utilize the non-vinyl compositions disclosed.

The non-vinyl composition of the present invention comprises a blend of a 30 terpolymer and a copolymer. Surprisingly, it has been found that blends of terpolymers and copolymers result in a composition that can be made into a resilient floor tile or sheet flooring using conventional equipment or existing equipment that is used to make a vinyl polymer tile or vinyl sheet flooring. Specifically, it has been found that blends of terpolymers and copolymers result in a composition that permits the material to be ground and cut using conventional equipment, whereas the terpolymers or copolymers alone were too elastic to be ground or cut or would be incapable of being processed at all. More specifically, the resulting polymer blends permit successful grinding of excess material into small particles that can be recycled in the process, thereby reducing the loss of starting material. In addition, the polymer blends permit successful cutting of the material into individual tiles or into a sheet flooring having predetermined dimensions. Further, the polymer blends of the present invention permit the resilient floor tile or sheet flooring to be constructed without the use of stabilizers or plasticizers.

In one embodiment, the present invention comprises a non-vinyl resilient floor tile made from a non-vinyl composition comprising a mixture of a terpolymer and a copolymer. In another embodiment, the present invention comprises a non-vinyl resilient sheet flooring made from a non-vinyl composition comprising a mixture of a terpolymer and a copolymer.

Generally, the non-vinyl composition comprises a terpolymer-copolymer mixture. Preferably, the terpolymer comprises acrylic acid, methyl acrylate and ethylene. More preferably, the acrylic acid comprises approximately 6-6.5% by weight of the terpolymer; the methyl acrylate comprises approximately 6.5-20% by weight of the terpolymer; and the ethylene comprises the balance of the terpolymer composition. The copolymer generally functions to raise the modulus of the overall composition to enable cutting and grinding of the composition. Preferably, the copolymer comprises ethylene-methacrylic acid; however, other polymers or additives may be used to provide a cross-linked network to similarly raise the modulus of the composition.

In one preferred embodiment, the present invention comprises a resilient floor tile that generally comprises a single substrate layer or tile body comprising a non-vinyl composition comprising a terpolymer and a copolymer. Additionally, the non-vinyl tile may comprise a filler, preferably limestone, and a tackifier, such as SN 99, available from Neville Chemical Company, and various pigments. It should be appreciated, however, that other layers and other additives or components may be used as desired. For example, a protective layer or permanent surface layer or film comprising, for example, urethanes or acrylated urethanes may be applied.

Preferably, the terpolymer comprises a terpolymer of ethylene-methyl acrylate-acrylic acid having a composition described above, such as AT 310, available from Exxon. Other terpolymers that may be used include AT 320 and AT 325 also available from Exxon. Preferably the copolymer comprises a composition as described above, such as an ionomer of ethylene and methacrylic acid produced with metal salts and filler, such as SURLYN 1601 (sodium grade), 8150 (sodium grade), 8660 (sodium grade), 9910 (zinc grade), or a lithium grade version, available from DuPont. Any of the foregoing terpolymers may be used with any of the foregoing copolymers, and, similarly, any of the foregoing copolymers may be used with any of the foregoing terpolymers.

The terpolymer comprises approximately 8-30% by weight of the total tile composition or starting materials, and the copolymer comprises approximately 0.1-16% by weight of the total starting materials. In a preferred embodiment, the terpolymer comprises approximately 8% by weight of the total starting materials, and the copolymer comprises approximately 2% by weight of the total starting materials. The filler, preferably limestone, comprises at least 50% by weight of the total starting materials and, preferably, comprises approximately 87% by weight. The tackifier comprises between approximately 0.5-4% by weight of the total starting materials, and in a preferred embodiment comprises approximately 2-3% by weight. The pigments are an optional starting material, but in a preferred embodiment, the pigments comprise approximately 1% by weight of the starting materials. In a preferred embodiment, the terpolymer comprises approximately 8% by weight of the total starting materials; the copolymer comprises approximately 2% by weight of the total starting materials; the limestone filler comprises approximately 87% by weight of the starting materials; the tackifier comprises approximately 2% by weight of the starting materials; and the pigments comprise approximately 1% by weight of the starting materials. It should be appreciated that one advantage of the present invention is that neither stabilizers or plasticizers are necessary, although these components may be added to the starting materials if so desired.

FIG. 1 is a process flow schematic of a process for making a resilient non-vinyl floor tile according to one embodiment of the present invention. In this process 100, starting materials 102 for the construction of the non-vinyl resilient floor tile are fed to a blender 104, such as a ribbon-type blender, where they are initially blended or mixed together. The starting materials could also be added collectively to a hopper that is fed to a mixer or directly to a Banbury mixer.

The starting materials 102 comprise a non-vinyl composition comprising a terpolymer and copolymer, which may each be fed separately or collectively, a filler, preferably limestone, and a tackifier, such as SN 99, available from Neville Chemical Company, and various pigments. Preferably, the terpolymer comprises a terpolymer of ethylene-methyl acrylate-acrylic acid having a composition described above, such as AT 310, available from Exxon. Other terpolymers that may be used include AT 320 and AT 325 also available from Exxon. Preferably the copolymer comprises a composition as described above, such as an ionomer of ethylene and methacrylic acid produced with metal salts and filler, such as SURLYN 1601 (sodium grade), 8150 (sodium grade), 8660 (sodium grade), 9910 (zinc grade) or a lithium grade version, available from DuPont. Any of the foregoing terpolymers may be used with any of the foregoing copolymers, and, similarly, any of the foregoing copolymers may be used with any of the foregoing terpolymers.

The terpolymer comprises approximately 8-30% by weight of the total tile composition or starting materials, and the copolymer comprises approximately 0.1-16% by weight of the total starting materials. In a preferred embodiment, the terpolymer comprises approximately 8% by weight of the total starting materials, and the copolymer comprises approximately 2% by weight of the total starting materials. The filler, preferably limestone, comprises at least 50% by weight of the total starting materials and, preferably, comprises approximately 87% by weight. The tackifier comprises between approximately 0.5-4% by weight of the total starting materials, and in a preferred embodiment comprises approximately 2-3% by weight. The pigments are an optional starting material, but in a preferred embodiment, the pigments comprise approximately 1% by weight of the starting materials. In a preferred embodiment, the terpolymer comprises approximately 8% by weight of the total starting materials; the copolymer comprises approximately 2% by weight of the total starting materials; the limestone filler comprises approximately 87% by weight of the starting materials; the tackifier comprises approximately 2% by weight of the starting materials; and the pigments comprise approximately 1% by weight of the starting materials. It should be appreciated that one advantage of the present invention is that neither stabilizers or plasticizers are necessary, although these components may be added to the starting materials if so desired.

After initial blending of the starting materials 102, the starting materials are transferred to a mixer 106, such as a Banbury mixer. In the mixer 106, the starting materials are mixed under friction, thereby creating heat, which heats the starting materials. The starting materials are heated past their softening points to create a mass having a consistency similar to fluid putty. In one embodiment, the temperature of the starting materials when discharged from the mixer 106 is approximately 350-370° F. It should be appreciated that while the mixer 106 is operated in a batch-wise mode, a continuous-type mixer may also be used.

The heated starting materials or stock are then transferred to a mill 108 to form a sheet having a thickness of approximately 2-3". The mill 108 comprises a pair of heated rollers. One roller is heated to a temperature of approximately 300-400° F., and the other roller is heated to a temperature of approximately 250-290° F.

The heated stock is then sent to a scratcher 110, which also comprises a pair of heated rollers and a third roller having a plurality of pins extending from the roller surface that tear the thick sheet into separate pieces or particles to remove voids and to prevent the formation of blisters in the stock. One of the heated rollers of the scratcher 110 is heated to a temperature of approximately 300-340° F., and the other heated roller is heated to a temperature of approximately 200-220° F. It should be appreciated that the composition needs to have sufficient tack to one of the heated rollers. Therefore, the temperature of the heated rollers is adjusted to accommodate the composition being processed to ensure sufficient tack.

Since the stock at this point has been torn into a plurality of particles, ground, pigmented pieces 112 may optionally and conveniently be added to the stock by a feeder 114 to provide color contrast for design effects. In one embodiment, these pigmented pieces 112 may comprise recycled stock, in particular window frame from the press 128 discussed below. It should be appreciated, however, that these pigmented pieces 112 may be any material appropriate for addition to the stock and for use in the final tile product. Such materials include, for example, pigmented flakes from a separate or different source, pearlescent particles or other polymers that are capable of pigmentation in ground, flake or pellet forms.

The particles are next sent to a sheeter 116 that forces the particles back into a single sheet. The sheeter 116 is a horizontal nip comprising two rolls that impart heat and pressure to the particles to form the sheet. One roller of the sheeter 116 is heated to a temperature of approximately 300-400° F., and the other roller is heated to a temperature of approximately 250-290° F. If pigmented pieces 112 were added, the sheet exiting the sheeter 116 comprises a somewhat uniform coloration with irregular streaks (i.e., the initial mottle).

At this point, additional ground, pigmented pieces 118 may optionally be added using a feeder 120 to the top of the sheet exiting from the sheeter 116, thereby creating a top mottle, which acts as the final surface decoration and color. It should be appreciated that the pigmented pieces 118 may be the same as, or different from, the pigmented pieces 112 added between the scratcher 110 and the sheeter 116. Therefore, these pigmented pieces 118 may also be window frame from the press 128 or pigmented flakes from a separate or different source. It should be appreciated that pigmented particles may be added by both feeders 114, 120 or by either feeder 114, 120 alone depending upon the desired design effect. It should also be appreciated that recycling the window frame or trim from the press 128 improves the efficiency of the overall process 100.

The sheet comprising the optional initial mottle and/or the optional top mottle is sent to a series of two pairs of smoothing rollers or calendars 122, 124 to make the surface of the sheet smooth and uniform and to reduce the thickness or gauge of the sheet. Each of the pairs of rollers 122, 124 may be heated. The first pair of rollers 122 may have one roller heated to a temperature of approximately 300-340° F. and the other roller heated to a temperature of approximately 210-240° F. The second pair of rollers 124 may have one roller heated to a temperature of approximately 210-240° F. and the other roller heated to a temperature of approximately 55° F. The sheet then enters a planisher 126 to achieve the desired final gauge and smoothness of the sheet. The planisher also comprises two heated rollers. It should be appreciated that roll temperatures at this stage of the process are selected to obtain properties of caliper, smoothness and tack. Preferably, each roller is heated to a temperature of approximately 200° F. In one embodiment, the final gauge is approximately 125 mils or ⅛". It should also be appreciated that composition may be mechanically embossed using the calendars or planisher or both.

The sheet is then sent to the press 128 where the individual tiles are cut from the sheet. The press 128 comprises a die that is compressed against the sheet to cut the sheet into a number of given tiles having desired square or rectangular dimensions, such as 9"×9", 12"×12", 14"×14", 16"×16" or 18"×18". As the tiles are cut from the sheet there is trim or window frame remaining, which is ejected from the press 128. This window frame may be subsequently ground and recycled back to the process 100 as pigmented pieces to be added using either one or both of the feeders 114, 120, as described above. The cut tiles are then transferred from the press 128 and stacked for shipping. It should be appreciated, however, that prior to entering the press and cutting the tiles, a protective layer, such as a wax layer comprising an aqueous latex dispersion, may be applied to the top of the tile for initial service purposes. It should also be appreciated that other layers, coatings or components may be added to the tile as desired. For example, a protective layer or permanent surface layer or film comprising, for example, urethanes or acrylated urethanes may be applied.

In another preferred embodiment, the present invention comprises a resilient non-vinyl sheet flooring. In one embodiment, the non-vinyl sheet flooring comprises a single substrate layer or sheet flooring body comprising a non-vinyl composition comprising a terpolymer and a copolymer. In addition, the non-vinyl sheet flooring may also comprise a filler, preferably limestone, and a tackifier, such as SN 99, available from Neville Chemical Company, and various pigments. Notably, in this embodiment, the sheet flooring does not have a backing substrate. However, it should be appreciated that other layers and other additives or components may be used as desired. For example, a protective layer or permanent surface layer or film comprising, for example, urethanes or acrylated urethanes may be applied.

Preferably, the terpolymer comprises a terpolymer of ethylene-methyl acrylate-acrylic acid having a composition described above, such as AT 310, available from Exxon. Other terpolymers that may be used include AT 320 and AT 325 also available from Exxon. Preferably the copolymer comprises a composition as described above, such as an ionomer of ethylene and methacrylic acid produced with metal salts and filler, such as SURLYN 1601 (sodium grade), 8150 (sodium grade), 8660 (sodium grade), 9910 (zinc grade), or a lithium grade version, available from DuPont. Any of the foregoing terpolymers may be used with any of the foregoing copolymers, and, similarly, any of the foregoing copolymers may be used with any of the foregoing terpolymers.

The terpolymer comprises approximately 8-30% by weight of the total tile composition or starting materials, and the copolymer comprises approximately 0.1-16% by weight of the total starting materials. In a preferred embodiment, the terpolymer comprises approximately 8% by weight of the total starting materials, and the copolymer comprises approximately 2% by weight of the total starting materials. The filler, preferably limestone, comprises at least 50% by weight of the total starting materials and, preferably, comprises approximately 87% by weight. The tackifier comprises between approximately 0.5-4% by weight of the total starting materials, and in a preferred embodiment comprises approximately 2-3% by weight. The pigments are an optional starting material, but in a preferred embodiment, the pigments comprise approximately 1% by weight of the starting materials. In a preferred embodiment, the terpolymer comprises approximately 8% by weight of the total starting materials; the copolymer comprises approximately 2% by weight of the total starting materials; the limestone filler comprises approximately 87% by weight of the starting materials; the tackifier comprises approximately 2% by weight of the starting materials; and the pigments comprise approximately 1% by weight of the starting materials. It should be appreciated that one advantage of the present invention is that neither stabilizers or plasticizers are necessary, although these components may be added to the starting materials if so desired.

This particular embodiment of a non-vinyl sheet flooring comprising a single substrate layer or sheet flooring body comprising a non-vinyl composition comprising a terpolymer and a copolymer may be made in a manner similar to that described in connection with FIG. 1. For example, the entire process described in connection with FIG. 1 may be followed, except that instead of sending the sheet to a press 128 that cuts the sheet into individual tiles, the sheet is simply rolled and used as sheet flooring. In other words, the same composition and process used to make tiles according to the present invention, may be used to make sheet flooring by simply not cutting the sheet into individual tiles. It should be appreciated that each of the options described above in connection with the process of FIG. 1 and the composition of the non-vinyl tile are also options in connection with the manufacture of this embodiment of sheet flooring.

Alternatively, this single layer sheet flooring may be laminated to a backing substrate to provide a sheet flooring product that has a backing substrate. The backing substrate may be any material capable of supporting and adhering to the sheet flooring. Preferably, the backing substrate is a highly filled mineral felt, although a glass matte or synthetic film or scrim may also be used.

In another embodiment, a resilient non-vinyl sheet flooring comprises a backing substrate that is preferably a highly filled mineral felt, although a glass matte or synthetic film or scrim may also be used, and a layer on top of the backing substrate comprising a non-vinyl composition comprising a terpolymer and a copolymer. The thickness of the backing substrate ranges from approximately 0.20-0.32", although any thickness may be used. The non-vinyl composition on top of the backing substrate comprising a mixture of terpolymer and copolymer, which may optionally include a pigment, is added to the top surface of the backing substrate in the form of ground particles or flakes, as described further below. On top of this polymeric layer is an optional protective layer or top coating layer, such as a latex or urethane film. It should be appreciated that additional components may also be present in the sheet flooring, such as a latex that is mixed with other polymeric particles or other flake or powdered particles.

Preferably, the terpolymer comprises a terpolymer of ethylene-methyl acrylate-acrylic acid having a composition described above, such as AT 310, available from Exxon. Other terpolymers that may be used include AT 320 and AT 325 also available from Exxon. Preferably the copolymer comprises a composition as described above, such as an ionomer of ethylene and methacrylic acid produced with metal salts and filler, such as SURLYN 1601 (sodium grade), 8150 (sodium grade), 8660 (sodium grade), 9910 (zinc grade) or a lithium grade, available from DuPont. Any of the foregoing terpolymers may be used with any of the foregoing copolymers, and, similarly, any of the foregoing copolymers may be used with any of the foregoing terpolymers.

Figure 2:
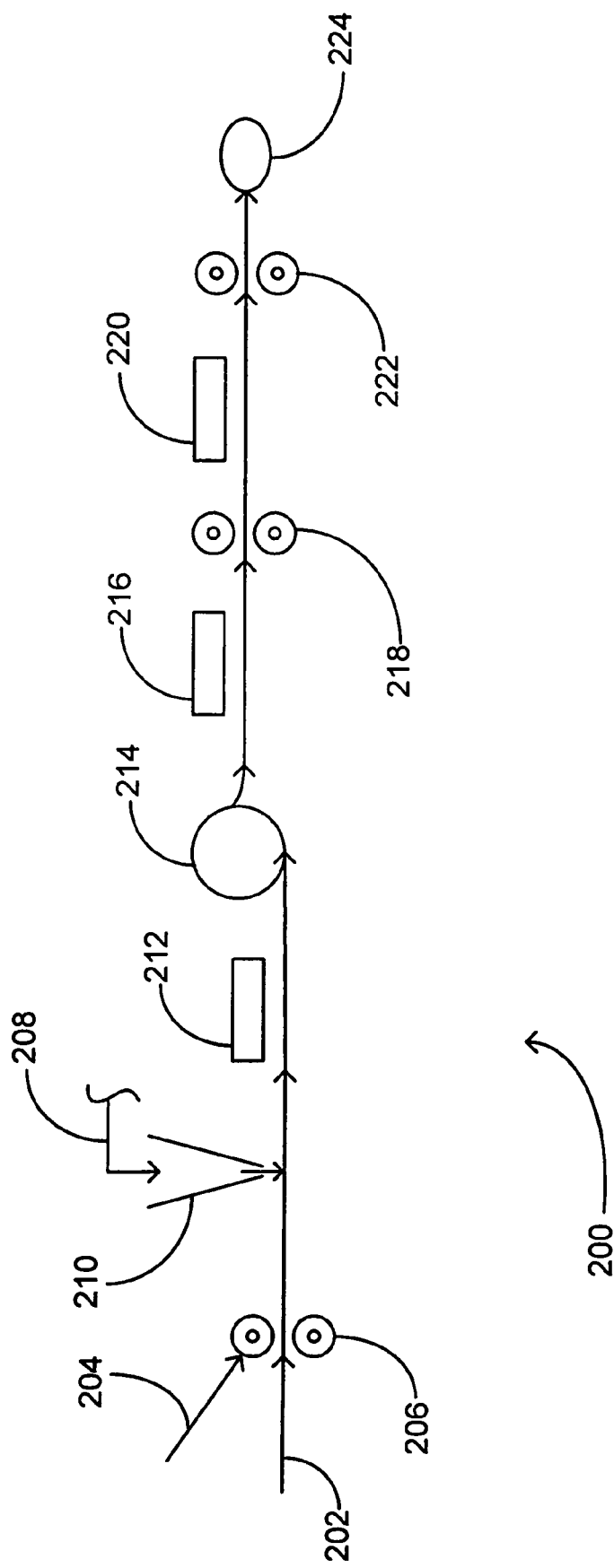
FIG. 2 is a process flow schematic of a process for making a non-vinyl sheet flooring according to one embodiment of the present invention.

FIG. 2 is a process flow schematic of a process for making a non-vinyl sheet flooring according to one embodiment of the present invention. In the process 200, a backing substrate 202 is passed into a reverse roll coater 206. The backing substrate preferably comprises a highly filled mineral felt, although a glass matte or synthetic film or scrim may also be used. The thickness if the backing substrate 202 ranges from approximately 0.20-0.32" and is preferably 0.20", 0.45" or 0.32", although any thickness may be used. The backing substrate 202 may have any width capable of being processed. Preferably, the backing substrate 202 has a width of approximately 75.5".

The mixture of terpolymer and copolymer, in the form of ground particles or flake, 208 is added to the top of the backing substrate 202 through a feeder 210. Preferably, the polymeric mixture is added in the form of flake at a rate of approximately 1-5 lbs/square yard of backing substrate and more preferably at 1.5-2.5 lbs/square yard. Preferably, the terpolymer comprises a terpolymer of ethylene-methyl acrylate-acrylic acid having a composition described above, such as AT 310, available from Exxon. Other terpolymers that may be used include AT 320 and AT 325 also available from Exxon. Preferably the copolymer comprises a composition as described above, such as an ionomer of ethylene and methacrylic acid produced with metal salts and filler, such as SURLYN 1601 (sodium grade), 8150 (sodium grade), 8660 (sodium grade), 9910 (zinc grade) or a lithium grade version, available from DuPont. Any of the foregoing terpolymers may be used with any of the foregoing copolymers, and, similarly, any of the foregoing copolymers may be used with any of the foregoing terpolymers.

However, a means for holding these polymer flakes in place on the backing substrate 202 is necessary, such as a non-vinyl binder or adhesive, a separate flake, powder or granule that is mixed with the polymer flakes that acts to hold the flakes together, or cross-linking agent that causes the flakes to cross-link. Preferably, an aqueous latex, such as an acrylic or polyurethane solution, 204 is also added to the reverse roll coater 206. Preferably, the aqueous latex comprises a polyurethane solution, such as NOVEON SANCURE 20025, available from Noveon. The aqueous latex 204 is added to the backing substrate 202 at a thickness of approximately 10-40 mils. Preferably, the latex 204 is applied to a thickness of approximately 10-40 mils and more preferably to a thickness of 25-35 mils. Alternatively, a film, such as a polyethylene or polypropylene, may be laminated to the backing substrate 202. Subsequently, this film may be alternatively heated and at least partially melted such that the polymeric mixture in the form of ground particles or flake will stick to the film.

Alternatively, a separate flake, powder or granule may be mixed with the polymeric mixture of particles or flake to produce a dry blend of both particles. These separate flakes may also have a cross-linking functionality to cross-link with the polymeric mixture, which may be caused thermally by application of heat or by application of radiant energy, such as electron beam. Alternatively still, a cross-linking agent may be added to the polymeric mixture such that the particles or flake cross-link between themselves. This may be accomplished by adding a chemical composition that upon the application of heat or radiant energy chemically reacts with the flakes and causes them to cross-link, thereby increasing the molecular weight and strength of the polymer. Such a chemical composition may be Sartomer SR 350, available from Sartomer, to the ground polymeric mixture of particles or flake.

Once the polymeric mixture has been deposited on the backing substrate, heat is applied to consolidate the polymeric mixture, thereby forming a solid mass from the polymeric mixture of flakes or particles that is at least substantially free of surface defects such as pits or holes and having good continuity in all three axis. Heat is applied using a heater 212, which may be an IR heater. Preferably, the material is heated to a temperature of approximately 190° F.

The backing substrate and the consolidated polymeric mixture is then passed using a heated drum roller 214, which operates at approximately 150° F. to continue to heat the mixture and to apply pressure to further consolidate the mixture, to a second heater 216. This second heater 216 acts to further consolidate the polymeric mixture by heating it to approximately 320° F.

The backing substrate and the consolidated polymeric mixture then enter the first of two planishers 218, to size the backing substrate and polymeric mixture to a desired thickness and smoothness. The planisher 218 comprises two heated rollers. It should be appreciated that roll temperatures at this stage of the process are selected to obtain properties of caliper, smoothness and tack. Preferably, each roller is heated to a temperature of approximately 200° F. It should be appreciated that composition may be mechanically embossed using the planisher 218.

It should also be appreciated that the composition of the ground or flake particles added to the backing substrate through the feeder 210 may be varied to provide a mixture of particles, some having one set of melt characteristics (e.g., melt temperature and flowability) and some having a different set of melt characteristics. For example, by combining flake particles having one composition and a corresponding set of melt characteristics with flake particles having another composition and corresponding set of melt characteristics, some of the particles may melt more easily and flow more readily over the surface of the backing substrate than the others. Upon utilizing the planishers, some of the particles may become more smooth and congruent with the overall smoothness imparted by the planishers, while other particles (e.g., those that melt less easily and flow less readily) may remain rigid and impart a texture to the sheet flooring.

After passing through the first planisher 218, the backing substrate and polymeric mixture is passed through another heater 220. This third heater 220 acts to further consolidate the polymeric mixture by heating it to approximately 320° F.

Finally, the backing substrate and polymeric mixture is passed through the second planisher 222 to form the final sheet flooring product having a desired final thickness or gauge. This planisher 222 also comprises two heated rollers. It should be appreciated that roll temperatures at this stage of the process are selected to obtain properties of caliper, smoothness and tack. In one embodiment, the final gauge is approximately 80 mils. Preferably, each roller is heated to a temperature of approximately 200° F. It should be appreciated that composition may again be mechanically embossed using this planisher 222. It should also be appreciated that other coatings or films known in the art may be applied in this planishing area. For example, a permanent surface layer or film comprising, for example, urethanes or acrylated urethanes may be applied. Alternatively or in addition, a removable top surface comprising, for example, an aqueous latex coating, that acts as a protective surface for installation. The final sheet flooring product is then passed to a winder 224 where it is rolled for shipping.

Various embodiments of the invention have been described. The descriptions are intended to be illustrative of the present invention. It will be apparent to one of skill in the art that modifications may be made to the invention as described without departing from the scope of the claims set out below. In particular, it will be clear to those skilled in the art that the present invention may be embodied in other specific forms, structures, arrangements, proportions, and with other elements, materials, and components, without departing from the spirit or essential characteristics thereof. For example, it is to be understood that the non-vinyl tile of the present invention may also contain additional layers or coatings known to one of skill in the art. In addition, the non-vinyl tile of the present invention may also be chemically and mechanically embossed. Further, while the present invention is described as a resilient non-vinyl floor tile, the tile may be used as a wall tile or for other purposes. The presently disclosed embodiments are, therefore, to be considered in all respects as illustrative and not restrictive, the scope of the invention being indicated by the appended claims, and not limited to the foregoing description.

What is claimed is:

1. A process for forming a non-vinyl flooring, comprising:
    blending a terpolymer comprising ethylene, methyl acrylate and acrylic acid, a copolymer comprising ethylene and methacrylic acid and limestone to form a blended mixture;
    heating said blended mixture to form a heated blended mixture;
    forming a first sheet from said heated blended mixture
    separating said first sheet into a plurality of pieces;
    forming a second sheet from said plurality of pieces, wherein said second sheet has a predetermined thickness;
    reducing said predetermined thickness of said second sheet; and
    forming a smooth surface on a top surface of said second sheet.

2. The process of claim 1, further comprising:
    adding a plurality of pigmented particles to said plurality of pieces before said forming of said second sheet, wherein said forming of said second sheet thereby creates a mottle in said second sheet.

3. The process of claim 2, further comprising:
    adding a second plurality of pigmented particles to a top surface of said sheet prior to said reducing, wherein a second mottle is thereby created on said top surface of said sheet.

4. The process of claim 1, wherein said heating is performed at approximately 350-370° F. utilizing a mixer, said forming of said first sheet is performed at approximately 260-340° F., said separating is performed at approximately 200-340° F., said forming of said second sheet is performed at approximately 260-340° F., said reducing of said predetermined thickness and said forming of said smooth surface are performed at approximately 55-340° F., and said cutting is performed at approximately 90-100° F.

5. The process of claim 1, further comprising laminating a backing substrate to said second sheet, thereby forming a sheet flooring.

6. The process of claim 1, further comprising cutting said second sheet into a plurality of tiles.

* * * * *